United States Patent
Shwartz et al.

(10) Patent No.: US 7,987,146 B2
(45) Date of Patent: Jul. 26, 2011

(54) SYSTEM AND METHOD FOR MATCHING MULTI-NODE SOFTWARE SYSTEM PROVISIONING REQUIREMENTS AND CAPABILITIES USING ROUGH SET THEORY

(75) Inventors: Larisa Shwartz, Scarsdale, NY (US); Genady Grabarnik, Scarsdale, NY (US); Maheswaran Surendra, Croton-on-Hudson, NY (US); Naga A. Ayachitula, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/669,781

(22) Filed: Jan. 31, 2007

(65) Prior Publication Data

US 2008/0168436 A1     Jul. 10, 2008

Related U.S. Application Data

(63) Continuation-in-part of application No. 11/361,783, filed on Feb. 24, 2006, now abandoned.

(51) Int. Cl.
*G06F 17/00* (2006.01)
*G06N 5/00* (2006.01)
(52) U.S. Cl. ......................................................... 706/45
(58) Field of Classification Search ...................... 706/45
See application file for complete search history.

(56) References Cited

U.S. PATENT DOCUMENTS

| | | | | |
|---|---|---|---|---|
| 5,677,955 A | * | 10/1997 | Doggett et al. | 705/76 |
| 6,021,202 A | * | 2/2000 | Anderson et al. | 705/54 |
| 6,209,095 B1 | * | 3/2001 | Anderson et al. | 713/176 |
| 6,609,200 B2 | * | 8/2003 | Anderson et al. | 713/176 |
| 7,007,266 B1 | * | 2/2006 | Isaacson | 717/100 |
| 7,669,029 B1 | * | 2/2010 | Mishra et al. | 711/170 |
| 7,779,034 B2 | * | 8/2010 | Pedersen et al. | 707/781 |
| 7,818,219 B2 | * | 10/2010 | Klivington et al. | 705/26.1 |
| 7,836,452 B2 | * | 11/2010 | Taylor | 718/104 |

OTHER PUBLICATIONS

Building Personalized Recommendation System in E-commerce Using Association Rule-based Mining and Classification, Zhang Xizheng; Software Engineering, Artificial Intelligence, Networking, and Parallel/Distributed Computing, SNPD 2007. Eighth ACIS Intl Conf on vol: 3 Digital Object Identifier: 10.1109/SNPD.2007.548, pp. 853-857.*

(Continued)

*Primary Examiner* — Michael Holmes
(74) *Attorney, Agent, or Firm* — Jeffrey N. Giunta; Fleit Gibbons Gutman Bongini & Bianco PL

(57) ABSTRACT

A system and method for provisioning software on a plurality of computational nodes in a distributed computing environment. A plurality of support processing requirements associated with a software product is accepted. The plurality of requirements is expanded into multiple sets of installation requirements. At least one set of installation requirements in the multiple sets of installation requirements are minimized to produce at least one minimized set of installation requirements. A determination is made as to whether any pair of requirements in the minimized set of installation requirements includes a pair of conflicting requirements. A determination of whether the software product allows each requirement in the pair of conflicting requirements to be located on separate nodes is also made. At least one multi-node installation topology is determined for the software product. The multi-node installation topology includes a plurality of installation requirement sets for each node in the multi-node installation topology.

20 Claims, 12 Drawing Sheets

OTHER PUBLICATIONS

Brown, et al., "A Model of Configuration Complexity and its Application to a Change Management System," *Proceedings of the 9th IFIP/IEEE International Symposium on Integrated Network Management (IM 2005)*, Nice, France, May 2005, 14 pages.

Chu, et al., "Installable Unit Package Format specification Version 1.0," *W3C Member Submission*, URL http://www.w3.org/Submission/2004/SUBM-InstallableUnit-PF-20040712/, Latest Version URL:http//www.w3.org/Submission/installableUnit-PF/, Jul. 12, 2004, 62 pages.

Hellerstein, et al., "The Champs System: Change Management with Planning and Scheduling," *Proceedings of the 9th IEEE/IFIP Network Operations and Management Symposium (NOMS 2004)*, Seoul, Korea, Apr. 2004, 14 pages.

Ressman, et al., "Use of Cfengine for Automated, Multi-Platform Software and Patch Distribution," *Proceedings of the Fourteenth Systems Administration Conference (LISA 2000)*, New Orleans, LA, Dec. 2000 (USENIX Association—open source alternative to Tivoli Config Manager), 26 pages.

Shinkawa, et al., "Identifying the Structure of Business Process for Comprehensive Enterprise Modeling," *IEICE Trans. Inf. & Syst.*, vol. E84-D, No. 2, Feb. 2001, pp. 239-248.

Skowron, et al., "The Discernibility Matrices And Functions in Information Systems," Intelligent Decision Support, *Handbook of Applications and Advances of Rough Sets Theory*, Part III, Chapter 2, Kluwer Academic Publishers, Dordrecht, Warsaw, Poland, 1992, pp. 331-362.

W3C Member Submission. Installable Unit Deployment Descriptor Specification Version 1.1. Jul. 12, 2004. Version URL: http://www.w3.org/Submission/2004/SUBMInstallable-DD-20040712/. Latest Version URL: http://www.w3.org/Submission/InstallableUnit-DD/.

Z. Pawlak, "Rough Sets," *Theoretical Aspects of Reasoning about Data*, Kluwer Academic Publishers, Dordrecht, Warsaw, Poland, 1991, TDLD 9, ISBN 0-7923-1472-7, pp. 33-63.

\* cited by examiner

FIG. 4

400 — Highest Level - Tivoli Intelligent Orchestrator Decision Table

| Decision # | Application/Component | Requirement | Relation Variable (RV) |
|---|---|---|---|
| 1 | Tivoli Intelligent Orchestrator | Application Server | 1 |
| | | Directory Server | 1 |
| | | Database Server | 1 |
| | | UNIX emulation layer | 1 |

FIG. 5

500 — Level 2 - Application Server Decision Table

| Decision # | Application/Component | Requirement | Relation Variable (RV) |
|---|---|---|---|
| 2 | Application Server | IBM Web Sphere Server 5.11 | 1 |

FIG. 6

600 — Level 2 - Directory Server Decision Table

| Decision # | Application/Component | Requirement | Relation Variable (RV) |
|---|---|---|---|
| 3 | Directory Server | IBM Tivoli Directory Server 5.2 | 1 |
| | | Microsoft Active Directory Server | 2 |

FIG. 7

700 — Level 2 - Database Server Decision Table

| Decision # | Application/Component | Requirement | Relation Variable (RV) |
|---|---|---|---|
| 4 | Database Server | IBM DB2 UDEE 8.2 | 1 |
| | | IBM DB2 8.1 | 2 |
| | | Oracle 8.i | 3 |
| | | Oracle 9.i | 4 |

| 800 | | 806 | 808 |
|---|---|---|---|
| 802 | Level 2 - UNIX Emulation Layer Decision Table | | |
| Decision # | Application/Component | Requirement | Relation Variable (RV) |
| 5 | Unix Emulation Server | Cygwin | 1 |
| 810 | 812 | 814 | 822 |

FIG. 8

| 900 | | 906 | 908 |
|---|---|---|---|
| 902 | Level 3 - IBM Tivoli Directory Server Version 5.2 Decision Table | | |
| Decision # | Application/Component | Requirement | Relation Variable (RV) |
| 6 | IBM Tivoli Directory Server Version 5.2 | IBM DB2 UDEE 8.2 | 1 |
| | | IBM DB2 8.1 | 2 |
| 910 | 912   916 | 914 | 924   922 |

FIG. 9

| 1000 | | 1006 | 1014 |
|---|---|---|---|
| 1002 | Level 1.2 - Tivoli Intelligent Orchestrator Decision Table | | |
| Decision # | Application/Component | Requirement | Relation Variable (RV) |
| 1 | Tivoli Intelligent Orchestrator | IBM Web Sphere Server 5.1 | 1.1 |
| | | Directory Server | 1.1 |
| | | Database Server | 1.1 |
| | | UNIX emulation layer | 1.1 |
| 1010 | 1012   1016 | 1020   1018 | 1028   1022 |
| | | | 1026   1024 |

FIG. 10

| Level 2 - Tivoli Intelligent Orchestrator Decision Table | | | |
|---|---|---|---|
| Decision # | Application/Component | Requirement | Relation Variable (RV) |
| 1.2.3 | Tivoli Intelligent Orchestrator | IBM Web Sphere Server 5.1 | 1.1 |
| | | IBM Tivoli Directory Server 5.2 | 1.1 |
| | | Database Server | 1.1 |
| | | UNIX emulation layer | 1.1 |
| | | IBM Web Sphere Server 5.1 | 1.1.2 |
| | | Microsoft Active Directory Server | 1.1.2 |
| | | Database Server | 1.1.2 |
| | | UNIX emulation layer | 1.1.2 |

FIG. 11

Level 1.2 - Tivoli Intelligent Orchestrator Decision Table

| Decision # | Application/Component | Requirement | Relation Variable (RV) |
|---|---|---|---|
| 1.2.3.4.5 | Tivoli Intelligent Orchestrator | IBM Web Sphere Server 5.1 | 1.1.1.1.1 |
| | | IBM Tivoli Directory Server 5.2 | 1.1.1.1.1 |
| | | IBM DB2 UDEE 8.2 | 1.1.1.1.1 |
| | | Cygwin | 1.1.1.1.1 |
| | | IBM Web Sphere Server 5.1 | 1.1.1.2.1 |
| | | IBM Tivoli Directory Server 5.2 | 1.1.1.2.1 |
| | | IBM DB2 UDEE 8.1 | 1.1.1.2.1 |
| | | Cygwin | 1.1.1.2.1 |
| | | ............ | ......... |
| | | IBM Web Sphere Server 5.1 | 1.1.2.3.1 |
| | | Microsoft Active Directory Server | 1.1.2.3.1 |
| | | Oracle 8.i | 1.1.2.3.1 |
| | | Cygwin | 1.1.2.3.1 |
| | | IBM Web Sphere Server 5.1 | 1.1.2.4.1 |
| | | Microsoft Active Directory Server | 1.1.2.4.1 |
| | | Oracle 9.i | 1.1.2.4.1 |
| | | Cygwin | 1.1.2.4.1 |

FIG. 12

1300
1302 — Level 1.2 - Tivoli Intelligent Orchestrator Decision Table

| Decision # | Application/Component | Requirement | Relation Variable (RV) |
|---|---|---|---|
| 1.2.3.4.5.6 | Tivoli Intelligent Orchestrator | IBM Web Sphere Server 5.1 | 1.1.1.1.1.1 — 1316 |
| 1310 | 1330 | IBM DB2 UDEE 8.2 | 1.1.1.1.1.1 — 1318 |
| | | IBM DB2 UDEE 8.2 | 1.1.1.1.1.1 |
| | | Cygwin | 1.1.1.1.1.1 |
| | | ................. | ............ |
| | | ................. | ............ |
| | | IBM Web Sphere Server 5.1 | 1.1.1.4.1.2 |
| | 1342 | Oracle 9.i | 1.1.1.4.1.2 |
| | | IBM DB2 UDEE 8.2 | 1.1.1.4.1.2 |
| | | Cygwin | 1.1.1.4.1.2 |

FIG. 13

| Computer System in the pool | Node 1 | Node 2 |
|---|---|---|
| CS 1 | (3, 2) | (1, 4, 5) |
| CS 2 | (2, 4) | (2, 1) |
| ....... | | ........... |

FIG. 15

| Computer System in the pool | Node 1 | Node 2 | ........ | Node $k$ |
|---|---|---|---|---|
| CS 1 | (3, 2) | (1, 4, 5) | ........ | (a, b, c, d) |
| CS 2 | (2, 4) | (2, 1) | ........ | (b, c, e) |
| .... | .... | .... | ........ | |
| CSn | (1, 1) | (2, 3, 1) | ........ | (f, g) |

FIG. 16

SYSTEM AND METHOD FOR MATCHING MULTI-NODE SOFTWARE SYSTEM PROVISIONING REQUIREMENTS AND CAPABILITIES USING ROUGH SET THEORY

CROSS REFERENCE TO RELATED APPLICATION

This application is a continuation-in-part of application entitled "System and Method for Deploying Software Based On Matching Provisioning Requirements and Capabilities" Ser. No. 11/361,783, filed Feb. 24, 2006, now abandoned, the entire contents and teachings of which are hereby incorporated herein by reference in their entirety.

FIELD OF THE INVENTION

The present invention generally relates to the field of software deployment, and more particularly relates to selecting software deployment topologies based on matching requirements of software products with capabilities on available processing systems.

BACKGROUND OF THE INVENTION

As the size and complexity of software systems increases, the reuse of independent pieces of software, combined in different ways to implement complex software systems, has become a widely accepted practice. A scaling-up of a software entity, through the addition of a new functionality (or the installation of a new application) can increase in the number of different components, inter-dependencies and interactions.

Software deployment across a distributed system many times results in a large number of installation options. These installation options can include nodes with different operating systems, resources, components, and components with contradicting support requirements. Current installation tools require predefined deployment topologies and predefined computing systems (e.g. machines). These problems derive from the essential complexity of the software requirements and dependencies and their nonlinear inter-relationships. The exponential increase of support requirements complexity is calling for additional levels of expert knowledge.

Currently, various package managing utilities are available that help to keep track various packages installed on different systems. For example, Debian has a low level package managing utility that can list all packages on the Linux system with such information as current status of the package, the errors (if any), short description of uses and more. *BSD Ports systems have built-in support for handling varying dependencies while managing the compilation and installation of third-party software that has been ported to BSD. Utilities such as Solution Install and TPM (IBM Tivoli products) also have configuration knowledge for each system on the network. However, even with these packaging managing utilities, software deployment systems still suffer from the problems discussed above.

Furthermore, administrators are usually given two choices for provisioning systems. The first is "granular" provisioning, whereby a system administrator manually installs each required application onto individual computers. This strategy is obviously inefficient. The second provisioning model is the "role-based" or "image-based" model, used for example, in IBM's Tivoli Provisioning Manager (TPM). This solution entails defining complete software stacks to install on various machines, each of which is assigned one or more roles. This automation saves administrator time and works well for existing computing grid users who tend to have predefined software stacks. However, image-based provisioning models do not work well for machines that utilize constantly changing applications (such as new revisions or applications with new software). The image-based provisioning models lose the fine-grained control inherent in the granular-provisioning model and therefore, do not work well when applied to the problem of scheduling across networks of heterogeneous nodes.

Therefore a need exists to overcome the problems with the prior art as discussed above.

SUMMARY OF THE INVENTION

Briefly, in accordance with the present invention, disclosed are a method, information processing system and computer program product for provisioning software on a plurality of computational nodes in a distributed computing environment. The method includes accepting a plurality of support processing requirements associated with a software product. Each of the support processing requirements specify a support component required by the software product. The plurality of requirements are expanded into multiple sets of installation requirements. At least one set of installation requirements in the multiple sets of installation requirements is minimized to produce at least one minimized set of installation requirements.

The method also includes determining whether any pair of requirements in the minimized set of installation requirements includes a pair of conflicting requirements. In response to at least one pair of requirements in the minimized set of installation requirements conflicting, the method determines whether the software product allows each requirement in the at least one pair of conflicting requirements to be located on separate nodes. At least one multi-node installation topology for the software product is determined in response to determining that the software product allows each requirement in the at least one pair of conflicting requirements to be installed on separate nodes. The at least one multi-node installation topology includes a plurality of installation requirement sets for each node in the multi-node installation topology.

In another embodiment an information proceessing system for provisioning software on a plurality of computational nodes in a distributed computing environment is disclosed. The information processing system includes a memory and a processor that is communicatively coupled to the memory. The information processing system also includes a deployment manager that is communicatively coupled to the memory and the processor. The deployment manager is adapted to accepting a plurality of support processing requirements associated with a software product. Each of the support processing requirements specify a support component required by the software product. The plurality of requirements are expanded into multiple sets of installation requirements. At least one set of installation requirements in the multiple sets of installation requirements is minimized to produce at least one minimized set of installation requirements.

The deployment manager is also adapted to determining whether any pair of requirements in the minimized set of installation requirements includes a pair of conflicting requirements. In response to at least one pair of requirements in the minimized set of installation requirements conflicting, the deployment manager determines whether the software product allows each requirement in the at least one pair of conflicting requirements to be located on separate nodes. At least one multi-node installation topology for the software product is determined in response to determining that the software product allows each requirement in the at least one pair of conflicting requirements to be installed on separate nodes. The at least one multi-node installation topology includes a plurality of installation requirement sets for each node in the multi-node installation topology.

In yet another embodiment, a computer program product for provisioning software on a plurality of computational nodes in a distributed computing environment is disclosed. The computer program product comprises instructions for accepting a plurality of support processing requirements associated with a software product. Each of the support processing requirements specify a support component required by the software product. The plurality of requirements are expanded into multiple sets of installation requirements. At least one set of installation requirements in the multiple sets of installation requirements is minimized to produce at least one minimized set of installation requirements.

The computer program product also includes instructions for determining whether any pair of requirements in the minimized set of installation requirements includes a pair of conflicting requirements. Instructions are also included to determine whether the software product allows each requirement in the at least one pair of conflicting requirements to be located on separate nodes In response to at least one pair of requirements in the minimized set of installation requirements conflicting. At least one multi-node installation topology for the software product is determined in response to determining that the software product allows each requirement in the at least one pair of conflicting requirements to be installed on separate nodes. The at least one multi-node installation topology includes a plurality of installation requirement sets for each node in the multi-node installation topology.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 4 is an exemplary decision table illustrating generic high level requirements of the software product to be deployed according to an embodiment of the present invention;

FIGS. 5-8 are exemplary decision tables illustrating specific requirements of the generic requirements in FIG. 4 according to an embodiment of the present invention;

FIG. 9 is an exemplary decision table illustrating the requirements of a specific instance of the generic requirement in FIG. 6 according to an embodiment of the present invention;

FIG. 10 is a refined exemplary decision table created from the tables in FIG. 4 and FIG. 5 according to an embodiment of the present invention;

FIG. 11 is another refined exemplary decision table created from the tables in FIG. 6 and FIG. 10 according to an embodiment of the present invention;

FIG. 12 is an unified decision table for a software product according to an embodiment of the present invention;

FIG. 13 is another refined exemplary decision table including conflicting and redundant requirements according to an embodiment of the present invention;

FIG. 15 is one example of a node resource description table according to an embodiment of the present invention;

FIG. 16 is one example of a node resource description table for a k-node topology for a pool of n computer systems according to an embodiment of the present invention;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by automating or at least aiding in the complex deployment decisions on provisioning complex software within large distributed environment compatible. Another advantage is that software requirements are matched to system capabilities for provisioning tasks within a pool of targets in such a way that a specified cost objective is met. The present invention allows for a configuration topology for the application to be determined based on the capacity of the systems that are available for the particular software product. For example, the present invention identifies an optimal configuration topology that can include multiple nodes or a single node.

Exemplary Network

Figure 1:
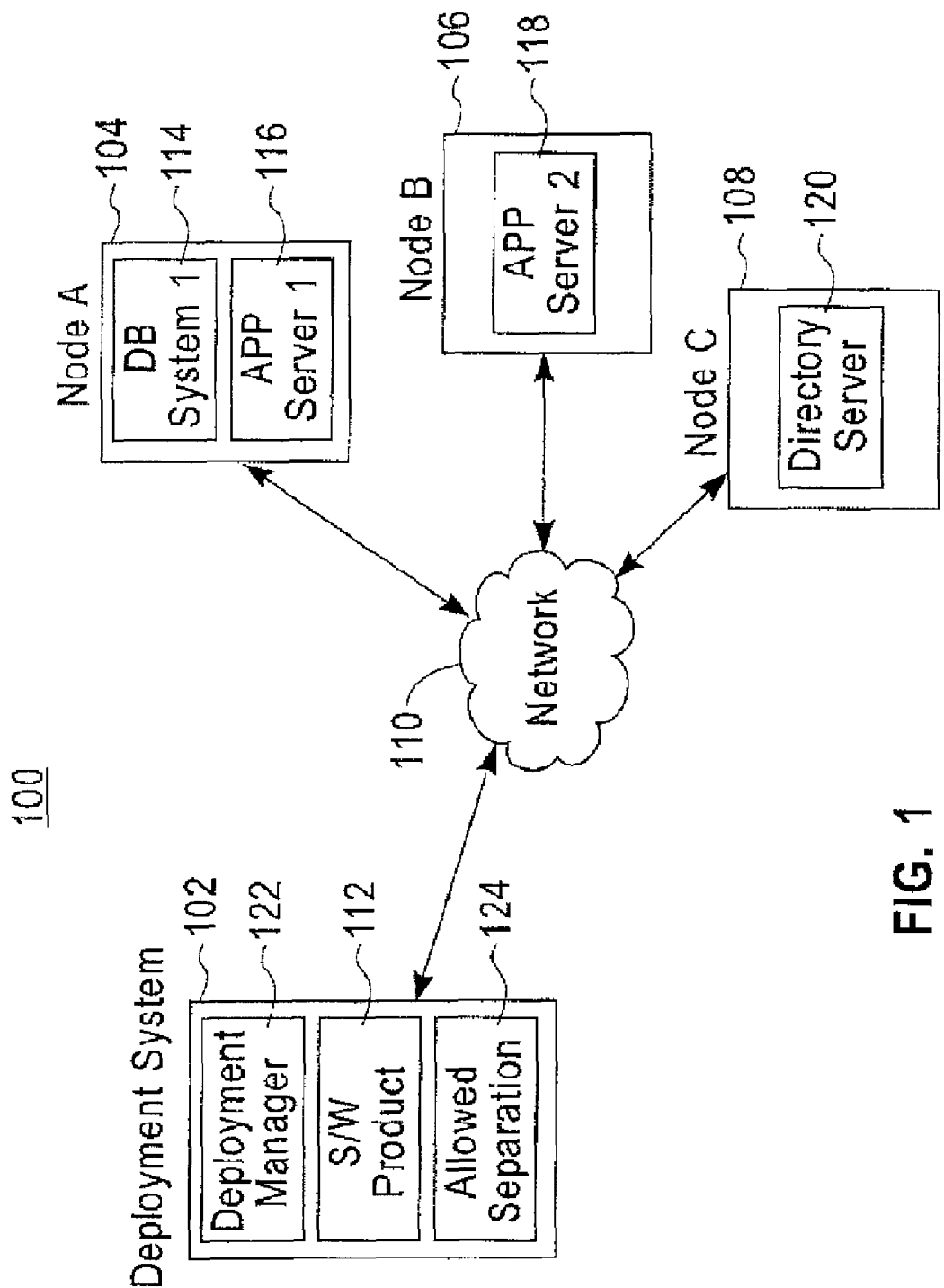
FIG. 1 is block diagram illustrating an exemplary software deployment system according to an embodiment of the present invention.

According to an embodiment of the present invention, as shown in FIG. 1, an exemplary distributed data processing system 100 is illustrated. A distributed data processing system is a network of computers in which the present invention may be implemented. The distributed data processing system 100 includes a software deployment system 102, information processing nodes 104, 106, 108, and a network 110. The network 110 is the medium used to provide communications links between the information processing nodes 104, 106, 108 that are connected together within the distributed data processing system 100. The network 110 may include wired or wireless connections. A few exemplary wired connections are cable, phone line, and fiber optic. Exemplary wireless connections include radio frequency (RF) and infrared radiation (IR), transmission. Many other wired and wireless connections are known in the art and can be used with the present invention.

In one embodiment of the present invention, the distributed data processing system 100 is connected to other distributed data processing systems through a wide area network included within network 110. The wide area network typically includes various network devices such as gateways, routers, hub, and one or more local area networks (LANs) that are interconnected with various media possibly including copper wire, coaxial cables, fiber optic cables, and wireless media. The wide area network may represent or include portions of the Internet. As is known in the art, the Internet includes a backbone of high-speed data communication lines between major nodes or host computers, consisting of thousands of commercial, government, educational and other computer systems that route data and messages. In another embodiment of the present invention, the distributed data processing system 100 is implemented as one or more types of networks, such as for example, an intranet, a local area network (LAN), or a wide area network (WAN).

The software deployment information system 102 includes a deployment manager 122 for deploying a software product 112 on one or more of the information processing nodes 104, 106, 108. The software deployment system 102 is discussed in greater detail below. In distributed computing systems, multiple server and client devices can be used and the present invention is not limited to any particular number of devices. The information processing nodes 104, 106, 108 may be, for example, personal computers or network computers. A network computer is any computer, coupled to a network, which receives a program or other application from another computer coupled to the network either permanently or temporarily. In some embodiments, various information processing nodes are able to be part of a processing cluster.

Additionally, the software product 112 includes a set of allowed separations 124. Allowed separations are represented as sets of components that can reside on different physical resources. For example, consider Database(D) and Application Server(AS) that are mandatory requirements for the software product 112 (Application A). If requirements AS and D are identified as conflicting requirements, then the software deployment system 102 can not find a single resource for the software product 112. However, if the software product 112 allows a separation of requirement AS and requirement D (D and AS are represented in the set of "allowed separations") the conflict can be resolved by introducing a two-node topology and allocating two resources for the software system product 112. In other words, on advantage of the present invention is that resources required by the software product 112 can be located on separate nodes. The above process is discussed in greater detail below.

In the system shown in FIG. 1, the information processing nodes 104, 106, 108 are clients to the software deployment information processing system 102. In other embodiments, one or more of the information processing nodes 104, 106, 108 can be clients to other servers connected to the network 110. The software deployment information system 102 is able to communicate with the information processing nodes 104, 106, 108 to provide data, such as operating system images, and applications to the information processing nodes 104, 106, 108 and to measure and capture device metrics of the information processing nodes 104, 106, 108.

The software product 112 has various support requirements such as required hardware, supporting software, operating system, and the like. These requirements may, in turn, have their own support requirements. For example, the software product 112 may require the availability of a specific database, which itself requires a particular operating system. The support requirements of the software product 112 can be located on either a single information processing node or on multiple information processing nodes. For example, in one embodiment, the software product 112 requires a database server 114, an application server 116, 118, and a directory server 120. The Information processing node A 104 includes the database server 114 and an application server 116. The information processing node B 106 includes another application server 118 and the information processing node C 108 includes the directory server 120.

The present invention can be used with heterogeneous or homogeneous systems. The term "heterogeneous" is commonly used to describe an environment in which the individual devices can have different hardware, application stacks, operating systems, and/or other different components. Conversely, the term "homogenous" is used to describe an environment in which the individual devices have similar hardware, application stacks, operating systems, and/or other components.

Exemplary Software Deployment Information Processing System

Figure 2:
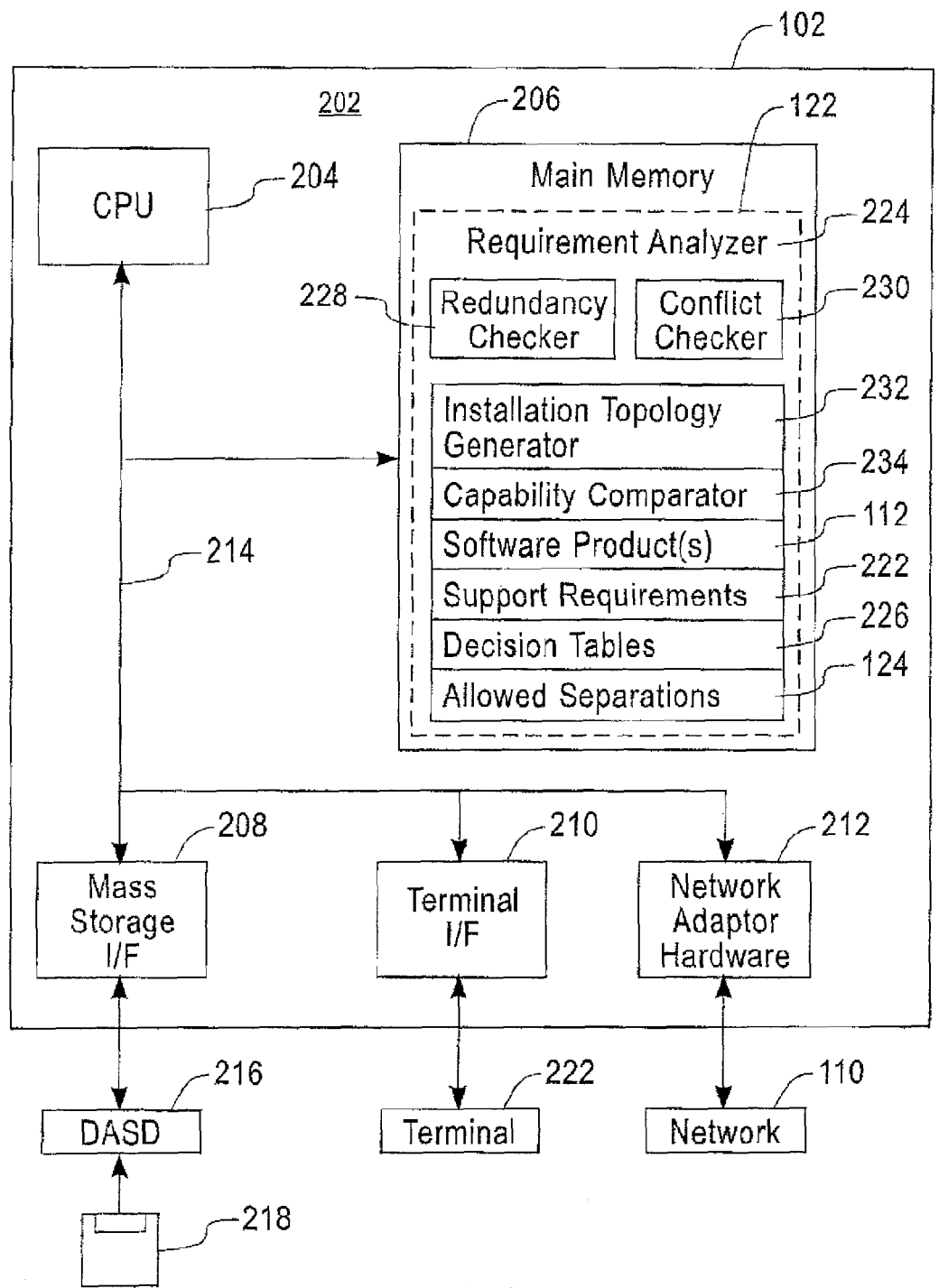
FIG. 2 is a block diagram illustrating an exemplary information processing system according to an embodiment of the present invention.

FIG. 2 is a block diagram illustrating a more detailed view of the deployment system 102 according to an embodiment of the present invention. The deployment system 102 is based upon a suitably configured processing system adapted to implement the exemplary embodiment of the present invention. Any suitably configured processing system is similarly able to be used as the deployment system 102 by embodiments of the present invention, for example, a personal computer, workstation, or the like. The deployment system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the deployment system 102 information processing system. One specific type of data storage device is a computer readable medium such as a floppy disk drive, which may be used to store data to and read data from a floppy diskette 218 or CD (not shown). Another type of data storage device is a data storage device configured to support, for example, NTFS type file system operations.

The main memory 206 comprises the deployment manager 122. The deployment manager includes a requirement analyzer 224. The requirement analyzer 224 analyzes the software product requirements 220, which also reside in the main memory 206. In this example, the software product requirements 220 are shown as residing in the main memory 206. In another embodiment, the software product requirements 220 reside in a database within the deployment system 102 or on a remote computer. In one embodiment, the requirements 220 are manually defined. In the exemplary embodiment, the requirement analyzer 224 creates decision tables 226, which are stored in the main memory 206. In another embodiment, the decision tables 226 are stored in a database residing in the deployment system 102 or on a remote server. Decision tables 226 allow the deployment system 102 to organize and sort through the complex requirement structures of the software product 112. The decision tables 226 will be discussed in greater detail below.

The requirement analyzer 224 also includes a redundancy checker 228 and a conflict checker 230. The redundancy checker 228 and the conflict checker allow for the requirement analyzer 224 to generate minimal non-conflicting sets of requirements. The redundancy checker 228 sorts through all of the required components and resources of the software product 112 and filters out any redundant requirements. This allows for a more efficient and accurate processing of requirements. The process for removing redundancies is described in greater detail below. The conflict checker 230 analyzes a set of requirements grouped together by the requirement analyzer 224 to identify conflicting requirements. For example, if a set of requirements being considered includes two conflicting database servers, the conflict checker 230 identifies this set and determines whether this set of requirements is an allowed separation set. The process for identifying conflicting sets and allowed separations is discussed in greater detail below.

The deployment manager 122 also includes an installation topology generator 232. The installation topology generator 232 creates sets of installation topologies that are used by the capability comparator 234, described below, to identify a set of optimal information processing nodes on which to install the software product 112. Each installation topology is a unique set of support component requirements for the software product 112 that are divided among the available nodes, as determined from the minimal non-redundant sets of requirements. The process for determining the installation topologies is discussed in greater detail below.

The capability comparator 234 takes the capabilities of each information processing node 104, 106, 108 and compares them to the requirements for individual nodes in each of the installation topologies 232. Support requirements that are not available on the information processing nodes 104, 106, 108 are then identified. In one embodiment, the capabilities and the requirements missing from each information processing node 104, 106, 108 are recorded in the main memory 206 or a database residing in the deployment system 102 or a remote computer. An installation configuration can be determined based on the capabilities and requirements needed to be installed on the information processing nodes 104, 106, 108 in light of the components already installed on these nodes. The installation configuration is considered in determining a set of optimal nodes to install the software product 112 and any missing support software products on. Once a set of optimal nodes is determined, the missing resource(s) is installed on the selected node or nodes in the set of nodes. The process for comparing the candidate installation topologies with the current capabilities of an information processing node 104, 106, 108 is discussed in greater detail below. The main memory 206 also includes a definition of the allowed separations 124 associated with the software product(s) 112. Although shown separate from the software product(s), the definitions of the allowed separations 124 can be included within the software product 112.

Although illustrated as concurrently resident in the main memory 206, it is clear that respective components of the main memory 206 are not required to be completely resident in the main memory 206 at all times or even at the same time. In one embodiment, the deployment system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the deployment system 102.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 222 to computer 202 to provide a user interface to the computer 202. These terminals 222, which are able to be non-intelligent or fully programmable workstations, are used to allow system administrators and users to communicate with the deployment system 102. The terminal 222 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the deployment system 102. The network adapter hardware 212 is used to provide an interface to the network 110. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 218, CD ROM, or other form of recordable media, or via any type of electronic transmission mechanism.

Exemplary Abbreviated Listing of Software Product Requirements

Figure 3:
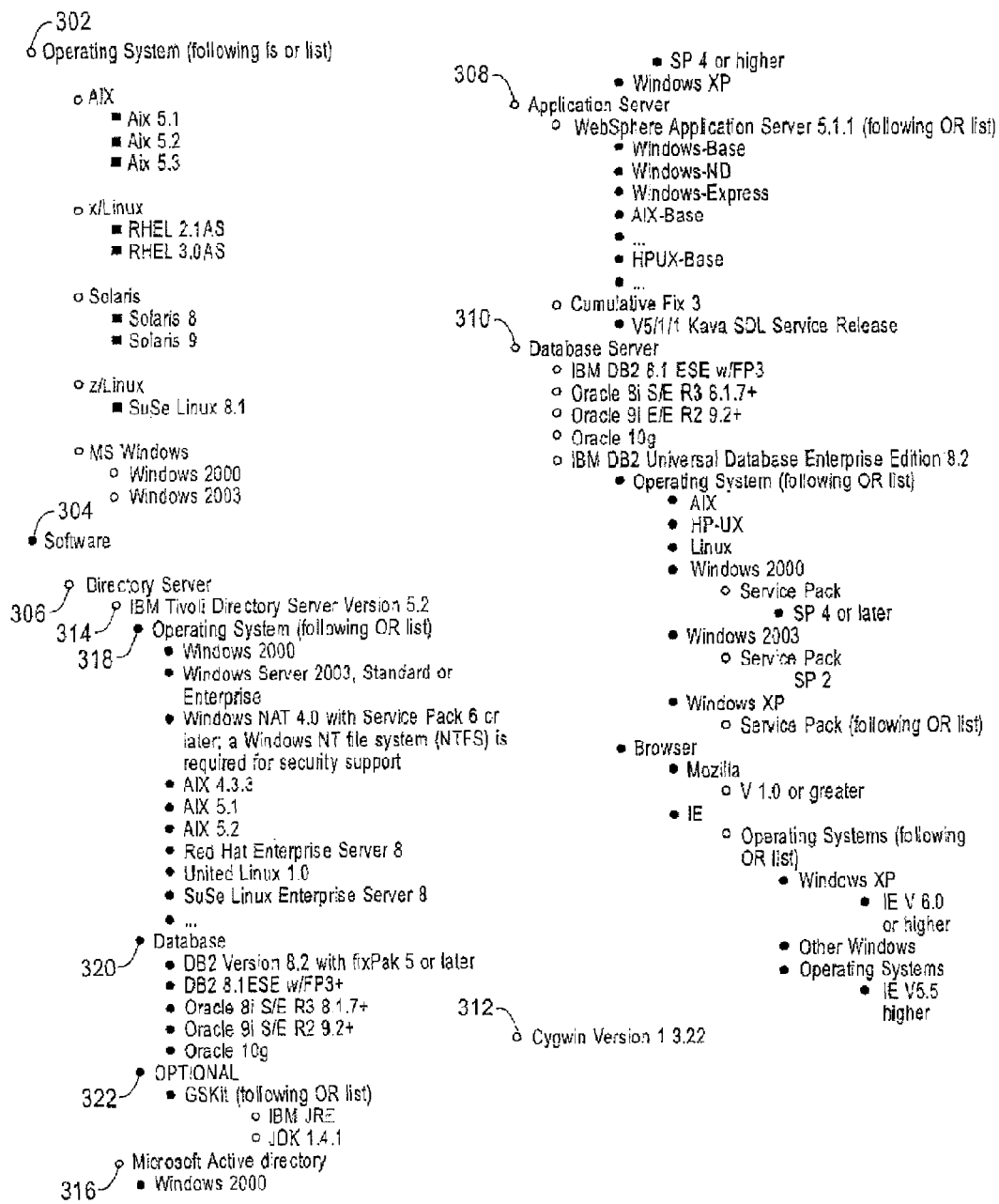
FIG. 3 is an exemplary abbreviated list of requirements for a software product to be deployed according to an embodiment of the present invention.

FIG. 3 illustrates an exemplary abbreviated listing of requirements 300 of the software product 112. For illustrative purposes only, the software product 112, in one embodiment, is the IBM Tivoli Installation Orchestrator. The requirement list 300 shows the requirements in a hierarchical fashion. High level generic requirements 302, 304 such as operating system and software are listed. Although only operating system and software requirements are listed, other requirements such as hardware requirements, e.g. disk space, RAM, processor, and the like can also be included. The listing 300 is only an abbreviated listing of requirements.

Each high level generic requirement 302, 304 includes subsequent or lower levels of requirements. For example, under the operating system requirement 302, a list of operating systems and versions that are compatible with the Tivoli Installation Orchestrator is shown. The software requirement 304 includes subsequent generic requirements for directory server 306, application server 308, database server 310, UNIX emulation layer (Cygwin) 312. Each generic software requirement 306, 308, 310, 312 includes specific software components that satisfy the generic software requirements. For example, the Tivoli Installation Orchestrator requires that the directory server 306 be either IBM Tivoli Directory Server Version 5.2 314 or Microsoft Active Directory 316.

Each lower level requirement such as IBM Tivoli Directory Server Version 5.2 is able to include its own requirements such as operating system 318, database 320, and is further able to include optional requirements 322. Redundant requirements and conflicting requirements can exist within the requirements of the software product 112. For example, two different operating systems that conflict with each other or two different database servers that conflict with each other can exist at different levels within the requirements hierarchy of the software product.

Exemplary Decision Tables

FIGS. 4-13 show exemplary decisions tables based on the requirements list 300 of FIG. 3. Decision tables support the interpretation, modeling and implementation of the process of determining a set of minimal non-redundant requirements; defining an application installation topology; eliminating redundant and conflicting requirements; determining ordered lists of missing requirements on each level; identifying the optimal set of information processing nodes out of a pool of existing nodes for application installation; and determining a minimal number of required nodes in the installation topology. In one embodiment of the present invention, Rough Set Theory is used to create the decision tables for automating and/or aiding decisions on provisioning complex software within a distributed environment.

Rough Set Theory is useful for information retrieval, decision support, machine learning, and knowledge based systems. Data analysis based on Rough Set Theory starts from a data table/decision table, which is called an information system. The information system includes data objects of interest characterized in terms of some attributes. When in the information system the decision attributes and conditions attributes are clearly defined it is called a decision table. The decision table describes decisions in terms of conditions that must be satisfied in order to carry out the decision specified in the decision table. With every decision table a decision algorithm can be associated, which is a set of 'if . . . then . . . ' decision rules. The decision rules can be viewed as logical a description of the basic properties of the data. The decision algorithm can be simplified, leading to optimal data description.

The software product 112 of the example illustrates in FIG. 4 and the subsequent figures, i.e., Tivoli Intelligent Orchestrator, can be deployed on various topologies such as a one-node topology, a two-node remote directory server, a two-node remote directory and database server, a two-node remote database server, a three-node topology such as is illustrated in FIG. 1, and the like. An exemplary embodiment of the present invention considers a multi-node topology for deploying the software product 112. and its support components However, the present invention is not limited to automating or aiding in deployment decisions for multiple nodes, the present invention is also directed towards deploying software products on single nodes as discussed in the co-pending and commonly assigned application entitled System and Method for Deploying Software Based On Matching Provisioning Requirements and Capabilities" Ser. No. 11/361,783, filed Feb. 24, 2006, now abandoned, which is incorporated herein by reference in its entirety.

As can be seen from FIG. 3, DB2 Universal Database Enterprise Edition 8.2 can be installed on different types of hardware and multiple Operating Systems (such as AIX, HP-UX, Linux, etc). As discussed above, conflicting requirements can exist amongst the resources required by the software product 112. To resolve the conflicting requirements means to identify atomic requirements within the hierarchy that are in conflict with one another or to find applications with conflicting requirements. Another activity that goes hand-in-hand with conflict resolution is illuminating redundant or irrelevant requirements. These types of requirements add unnecessary complexity and additional dimensions to the expanded set of requirements, as discussed below, and therefore reduce comprehensibility and processing speed.

Decision tables are very useful for eliminating redundant and conflicting requirements. The decision tables illustrated in FIGS. 4-13 have requirements on various levels, e.g. from applications and components to operating system ("OS") and hardware resources ("HR"). Each decision table represents a level state of the application to which the decisions table is associated with. An application requirement can have other applications, components, OS, or HR as a requirement. A component, on the other hand, is atomic and therefore may depend only on OS or HR.

The decision tables illustrated in FIG. 4 through FIG. 13 are only based on the software/application requirements of the software product 112. However, OS and HW requirements can also be added to the tables. For simplicity, these requirements are not shown in the decision tables. FIG. 4 through FIG. 12 show a sequence of decision tables 400-1300 for application requirements of the exemplary software product 112 Tivoli Intelligent Orchestrator. FIG. 4 shows a decision table 400 for the highest level requirements of the Tivoli Intelligent Orchestrator. The decision table 400 of FIG. 4 (and subsequent decision tables) includes a decision number field 402, an application/component field 404, a requirement field 406, and a relation variable ("RV") field 408. The decision number field 402 includes a decision entry 410 for identifying which decision in a sequence of decisions the current decision table 400 is associated with. For example, because the decision table 400 of FIG. 4 is the first decision table in the sequence of decisions, the decision number entry 410 includes the number 1.

The application/component field 404 identifies the application or component associated with the particular decision table. For example, in FIG. 4, which shows the highest level table, the application is the Tivoli Intelligent Orchestrator. The requirement field 406 includes entries identifying the requirements of the application/component in the application/component field 404. Because the decision table 400 in FIG. 4 is at the highest level, the requirements in the requirement field 406 are at the highest level. For example, the requirement entries 414, 416, 418, 420 identify that the Tivoli Intelligent Orchestrator requires an application server, directory server, database server, and a UNIX emulation layer.

The relation variable field 408 includes entries associated with each requirement in the requirement field 406 identifying the requirement as a mandatory or alternative requirement. The relation variable also represents the requirement path. For example, each of the requirements in the requirement entries 414, 416, 418, 420 of FIG. 4 are assigned a relation variable of 1 in the corresponding entries 422, 424, 426, 428. This is because there is not a high level generic optional requirement for each of these requirements. In other words, each of these requirements are necessary and not redundant. In other words, all four requirements are necessary for completing the installation of the Tivoli Intelligent Orchestrator.

FIG. 5 shows a second decision table 500 representing a second level of dependencies for the Tivoli Intelligent Orchestrator following the first decision illustrated in FIG. 4. The decision field 502 includes an entry 510 identifying this table 500 as being the second decision. The decision table 500 of FIG. 5 represents the decision to be made on the application server requirement. For example, the decision table 500 of FIG. 5 includes an entry 512 identifying the application/component for this table as the application server. The requirement field 506 includes an entry 514 identifying IBM Web Sphere Sever 5.1 as the only requirement option for the application server. Therefore, because an alternate requirement does not exist the relation variable field 508 includes an entry 522 of "1".

FIG. 6 shows a third decision table 600 also representing the second level of dependencies the Tivoli Intelligent Orchestrator. The decision field 602 includes an entry 610 identifying this table 600 as being the third decision. The decision table 600 of FIG. 6 represents the decision to be made on the directory server requirement. For example, the decision table 600 of FIG. 6 includes an entry 612 identifying the application/component for this table as the directory server. The requirement field 606 includes a first entry 614 identifying IBM Web Sphere Sever 5.1 as a requirement and a second entry 616 identifying Microsoft Active Directory Sever as another requirement. The requirements under the requirement field 606 in FIG. 6 are specific alternate instances of the directory server. For example, the Tivoli Intelligent Orchestrator can use either IBM Web Sphere Sever 5.1 or Microsoft Active Directory Sever to satisfy the directory server requirement. Therefore, these are alternate requirements and have different relation variables 622, 624 under the relation variable field 608 to indicate different branches in the requirement dependencies caused by these changes.

FIG. 7 shows a fourth decision table 700 also representing the second level of dependencies for the Tivoli Intelligent Orchestrator. The decision field 702 includes an entry 710 identifying this table 700 as being the fourth decision. The decision table 700 of FIG. 7 represents the decision to be made on the database server requirement. For example, the decision table 700 of FIG. 7 includes an entry 712 identifying the application/component for this table as the database server. The requirement field 706 includes a first entry 714 identifying IBM DB2 UDEE 8.2 as a first requirement; a second entry 716 identifying IBM DB2 as a second requirement; a third entry 718 identifying Oracle 8.i as a third requirement; and a fourth entry 720 identifying Oracle 9.i as a fourth requirement. The requirements under the requirement field 706 in FIG. 7 are specific alternate instances of the directory server. For example, the Tivoli Intelligent Orchestrator can use one of IBM DB2 UDEE 8.2, IBM DB2, Oracle 8.i, or Oracle 9.i to satisfy the database server requirements. Therefore, these are alternate requirements and have different values for their associated relation variables 722, 724, 726, 728 respectively under the relation variable field 708.

FIG. 8 shows a fifth decision table 800 that also represents the second level of dependencies of the Tivoli Intelligent Orchestrator. The decision field 802 includes an entry 810 identifying this table 800 as being the fifth decision. The decision table 800 of FIG. 8 represents the decision to be made on the UNIX emulation layer requirement. For example, the decision table 800 of FIG. 8 includes an entry 812 identifying the application/component for this table as the UNIX emulation layer. The requirement field 806 includes a first entry 814 identifying Cygwin as the only requirement. Therefore, because an alternate requirement does not exist the relation variable field 808 includes an entry 822 of "1".

As stated above, the decision tables 500, 600, 700, 800 are all level 2 decision tables. FIG. 9, on the other hand, shows a level 3 decision table 900 that corresponds to decisions for the Tivoli Intelligent Orchestrator, which is listed as a possible requirement 614 in FIG. 6. The decision field 902 includes an entry 910 identifying this table 900 as being the sixth decision. The decision table 900 of FIG. 9 represents the decision to be made on the Tivoli directory server requirement of the decision table 600 of FIG. 6. For example, the decision table 900 of FIG. 9 includes an entry 912 identifying the application/component as the IBM Tivoli directory server requirement. The requirement field 906 includes the possible requirements of the IBM Tivoli directory server. For example, a first entry 914 identifies IBM DB2 UDEE 8.2 and a second entry 916 identifies IBM DB2 8.1 as the types of databases that can be used with the IBM Web Sphere Server 5.1. Therefore, these are alternative requirements and have different relation variables 922, 924 under the relation variable field 908. Additional level 3 decision tables (not shown) are created for each requirement in the decision tables 600, 700, 800 of FIG. 6 through FIG. 8. This process is continued until all levels of requirements have a decision table associated with them.

Unified Decision Table

Once decision tables are made for each level of requirements, the tables are iterated through "width-first" to create an expanded, unified decision table for the exemplary software product 112, the Tivoli Intelligent Orchestrator. For example, a first level expanded decision table 1000 of FIG. 10 is created from the data included in decision tables 400, 500 of FIG. 4 and FIG. 5. The decision field 1002 includes an entry 1010 identifying this table 1000 as being decision number 1.2 because it combines decision number 1 and decision number 2. The decision table 1000 of FIG. 10 represents the decision on the Tivoli Intelligent Orchestrator. For example, the decision table 1000 of FIG. 10 includes an entry 1012 identifying the application/component for this table as the Tivoli Intelligent Orchestrator. The requirement field 1006 includes a first entry 1014 identifying IBM Web Sphere Sever 5.1 as a requirement; a second entry 1016 identifying a directory server as another requirement; a third entry 1018 identifying a database server as another requirement; and a fourth entry 1020 identifying a UNIX emulation layer as being another requirement.

As can be seen, the decision table 1000 of FIG. 10 plugs in the table 500 of FIG. 5 into the table 400 of FIG. 4. Because alternative requirements do not exist for the requirements 1014, 1016, 1018, 1020 in the table 1000 of the FIG. 10, each requirement receives the same value for its respective relation variable 1022, 1024, 1026, 1028. Furthermore, because there is only one entry in the table 500 of FIG. 5, the resulting decision of the table 1000 of FIG. 10 has only one set of requirements. The relation variable of "1.1" is a combination of the relation variable value of "1" from decision 1, illustrated in FIG. 4, and the relation variable value of "1" from decision 2, illustrated in FIG. 5.

FIG. 11 shows a decision table 1100 based on the decision tables 600, 1000 of FIG. 6 and FIG. 10. The decision field 1102 includes an entry 1110 identifying this table 1100 as being decision number 1.2.3 because it is a combination of decision number 1.2, is a combination of decisions 1 and 2, and decision number 3. The decision table 1100 of FIG. 11 represents the decision on the Tivoli Intelligent Orchestrator.

For example, the decision table 1100 of FIG. 11 includes an entry 1112 identifying the application/component for this table as the Tivoli Intelligent Orchestrator. The requirement field 1106 includes a first set of requirements 1130 and a second set of requirements 1132. The first set of requirements 1130 includes a first entry 1114 identifying IBM Web Sphere Sever 5.1 as the requirement for the application server; a second entry 1116 identifying the IBM Tivoli Directory Server 5.2 directory server as the requirement for the directory server; a third entry 1118 identifying a database server as another requirement; and a fourth entry 1120 identifying a UNIX emulation layer as being another requirement.

The second set of requirements 1132 includes a fifth entry 1134 identifying IBM Web Sphere Sever 5.1 as the requirement for the application server; a sixth entry 1136 identifying the Microsoft Active Directory Server as the requirement for the directory server; a seventh entry 1138 identifying a database server as another requirement; and an eighth entry 1140 identifying a UNIX emulation layer as being another requirement. As can be seen, the decision table 1100 of FIG. 11 plugs in the table 600 of FIG. 6 into the table 1000 of FIG. 10 to produce an expansion of requirements with two possibilities for the directory server. This results in two sets of requirements 1130, 1132 because two entries 614, 616 exist for the directory sever application/component in the table 600 of FIG. 6. Because alternative requirement sets exist in the table 1100 of the FIG. 11, the requirement sets that include one of these options receives a different value for relation variable of 1.1.1 and 1.1.2, respectively. The relation variables of 1.1.1 and 1.1.2 are a combination of the relation variable value of 1 and 2, respectively, from decision 3 (FIG. 6) and the relation variable value of 1.1 from decision 1.2 (FIG. 10).

The representation of the alternate requirement sets 1130, 1132 such as shown in FIG. 11 is an example of the distributive law, e.g. A and (B or C)=(A and B) or (A and C). In this example, "B" and "C" represent Tivoli directory server and Microsoft Active Directory Server, respectively, and "A" represents the remaining requirements at this level. As a result of processing all level two requirements of the Tivoli Intelligent Orchestrator as described with respect to FIG. 10 and FIG. 11, eight optional requirement sets are obtained. For example, FIG. 12 shows an expanded decision table 1200 illustrating some of the optional eight requirement sets. For example, FIG. 12 shows an expanded decision table 1200 based on the decision tables 400, 500, 600, 700, 800 of FIG. 4 to FIG. 8. The decision field 1202 includes an entry 1210 identifying this table 1200 as being decision number 1.2.3.4.5 because it is a combination of decision number 1 through decision number 5, illustrated in FIG. 40 to FIG. 8. The decision table 1200 of FIG. 12 represents the decisions on the Tivoli Intelligent Orchestrator. For example, the decision table 1200 of FIG. 12 includes an entry 1212 identifying the application/component of this table as the Tivoli Intelligent Orchestrator.

The requirement field 1206 illustrates some of the requirement sets, including, for example, a first set of requirements 1230 and an eighth set of requirements 1242. As can be seen, the decision tables 500, 600, 700, 800 of FIG. 5 to FIG. 8 are plugged into the decision table 400 of FIG. 400 resulting in different requirement sets. Each requirement in the requirements sets 1230, 1244, 1246, 1242 include some of the same relation variable values as the other requirements in the set. However, because the sets differ from one another, the set of relation variables also include some different values from the other requirement sets. For example, the requirements in the eighth set of requirements 1242 each have the relation variable 1.1.2.4.1. This is because the relation variable for decision 1 (FIG. 4) is 1; the relation variable for IBM Web Sphere Server 5.1 in decision 2 (FIG. 5) is 1; the relation variable for Microsoft Active Directory Sever in decision 3 (FIG. 6) is 2; the relation variable for Oracle 9.i in decision 4 (FIG. 7) is 4; and the relation variable for Cygwin in decision 5 (FIG. 8) is 1.

Identifying Allowed Separations and Eliminating Redundant Requirements

The process of combining decision tables as described above is continued to create the expanded set of installation requirements. If relation variable values of newly included tables differ, the new requirement groups are introduced. By using this mechanism, independence of the created groups of requirements is ensured. Enumeration of all possible options and knowledge about order of iterations define the relation variable value in a unique manner. In reverse, a requirement path can be restored using the relation variable by enumeration of the options and order of iterations. This process, however, may result in requirement sets that have a number of identical (i.e. redundant) or conflicting requirements. In order to identify conflicting requirements, "conflicting definitions" are defined. For example, the set of conflicting pairs (Tivoli Intelligent Orchestrator {(IBM DB2 UDEE 8.2, Oracle 9.i), (AIX, Win XP), (MS IE, Mozilla)}) define conflicting requirements for components that support Tivoli Intelligent Orchestrator. If any pair in a requirements set matches one of the "conflicting definitions" that required set is identified as a required set with conflicting requirements.

FIG. 13 shows a decision table 1300 including a requirement set 1330 with redundant requirements and a requirement set 1342 with conflicting requirements. The decision table 1300 of FIG. 13 is a combination of decision numbers 1, 2, 3, 4, 5 as illustrated in the decision tables 400, 500, 600, 700, 800, 900 of FIG. 4 to FIG. 9, respectively. Accordingly, the decision number entry 1310 under the decision field 1302 is 1.2.3.4.5.6. As can be seen, the requirement set 1330 with the relation variable 1.1.1.1.1.1 includes two requirements of IBM DB2 UDEE 8.2, which are redundant. The redundant requirements 1316, 1318 come from decisions 4 and 6 shown in FIG. 700 and FIG. 9. Therefore the set 1330 with the relation variable 1.1.1.1.1.1 is reduced to {IBM Web Sphere Server 5.1, IBM DB2 UDEE 8.2, Cygwin} to eliminate the redundancy.

The requirement set 1342 with the relation variable 1.1.1.4.1.2 includes a requirement of Oracle 9.1 and a requirement of IBM DB2 8.1. These two requirements match one pair of requirements in the "conflicting definitions" set of (Tivoli Intelligent Orchestrator {(IBM DB2 UDEE 8.2, Oracle 9.i), (AIX, Win XP), (MS IE, Mozilla)}), i.e. the first conflicting pair of DB2 and Oracle. The deployment manager 122 then analyzes the set of allowed separations 124 for the software product 112 to determine whether these two resources are allowed to be separated on two different systems. If this pair of resources is an allowed separation then a potentially valid two-node installation topology has been identified for the software product 112. Thus, at each level conflicting requirements are analyzed to determine whether they are an allowed separation pair. The groups are also minimized to exclude redundant requirements.

Expanding of Minimal Sets

The process of identifying allowed separations and eliminating redundant requirements results a minimal number of nodes required for installing the software product 112. This process also results in well-optimized sets of components that can be efficiently compared to system capabilities. System capabilities are the set of existing resources and components that are already installed on the system. However, comparing the minimized sets of requirements to the system capabilities reveals existing components and missing requirements on the lowest level of installed components, but does not reveal what applications might already preexist on the system.

Therefore, the minimized requirement sets are expanded with the applications. For example, as described above, each minimized requirement set includes a relation variable that indicates the "requirement path" or "table path" of the requirement set. This allows for the identification of the application level requirements for each set by looping through the tables with the appropriate identifier to mark applications that produced a requirement in the requirement set. The requirements identified on a higher level are added to each minimized requirement set. For example, the minimized requirements sometimes include lower level requirements that are based on a higher level requirement. However, the minimized sets do not generally include higher level requirements. The minimized sets are expanded to include the higher level requirement. Higher level requirements are added for optimization. For example, each high level requirement includes a number of derived requirements, e.g. the Tivoli Intelligent Orchestrator requires Directory Server and Directory Server, in its turn, has five other different requirements (assumed to be atomic). When the requirement set is minimized, it has those five requirements, but not the Directory Server requirement.

Consider the following example for matching capabilities of a system to the requirement set. On a system with Directory Server already running, the system also has the five requirements, so the match finds that five requirements are met on the system. The deployment system 102 determines that Directory server has all of the requirements met. The deployment system 102 then has to check if Directory Server is installed or determine if the five components are there just because of other applications. Therefore, the present invention expands the minimized set of requirements to include the higher level requirement of Directory Server (in this example) to check if Directory Server exists first. If Directory Server is installed, the deployment system 102 knows that the five components are also on the system being matched. Accordingly, the deployment system 102 can skip checking for those five requirements. If the system being matched does not include Directory Server, the five requirements need to be checked separately.

In one embodiment, this is accomplished based on the decision number and relation value. For example the relation variable value of 1.1.1.4.1.2.1 in the decision number 1.2.3.4.5.6.7 requires adding all entries of value 1 from decision #1, all entries of value 1.1 from decision #1.2, all entries of value 1 from decision #3 and so on. Thus extending each minimized non-conflicting set of requirements with higher level requirements creates partially ordered sets. In the above example, one of the sets will have the following structure {(TIO), (Tivoli Directory Server Version 5.2, Oracle 8i, Web Sphere Application Server 5.1.1, Cygwin), . . . , (MS Windows 2000, SP 4), . . . }. The requirements of the same level are separated by parentheses for additional clarity. Newly created sets, while redundant as a whole because applications and their components are included, have minimal and non-redundant requirements in the subset of level-requirements. These newly created sets are referred to, in one embodiment, as installation topologies.

Matching System Capabilities to Installation Topologies

As discussed above, an exemplary embodiment of the present invention determines an optimal multi-node installation topology for the software product 112. The following is a discussion on identifying the minimal number of nodes required for installing the software product 112 on multiple nodes. The necessary constraint in this case of a multi-node installation topology is the absence of conflicting requirements for each machine. In considering the set of all requirements, the concept of Height as number of disjoint requirements on each element (component) is introduced. The function EH(e) is defined as the maximum number of the disjoint requirements for the element e for a given installation. For example, the following condition on the number of nodes in a topology is necessary for the installation on the specified number of nodes (#nodes):

$$\min_{Ins \in \mathcal{J}} \max_{\mathcal{E} \in Ins} EH(\mathcal{E}) \leq \# \text{ nodes} \quad \text{(Eq 1)}$$

here J is a set of all admissible installations. To further refine the condition the set of requirements is expressed as a set of the subsets of independent groups of non-conflicting requirements. For example, when a requirement for the Application(A) has sub-requirements Database(D) and Application Server(S) and those sub-requirements D and S could be installed on different nodes ("allowed separations"), continuing this process result in at least two sets of requirements that correspond to different nodes. To reflect this notion the concept of Partition denoted by:

$$P(\text{Ins}) = \{\{\epsilon_1, \ldots, \epsilon_{i_1}\}, \ldots, \{\epsilon_{i_{n-1}}, \ldots, \epsilon_{i_n}\}\} \quad \text{(Eq 2)}$$

In one embodiment, consideration of the minimal partition is sufficient, which is the partition that does not contain further subdivisions. The following inequality provides upper estimate for the number of nodes in admissible installation:

$$\max_{Ins \in \mathcal{J}} \# \mathcal{P}(Ins) \geq \# \text{ nodes} \quad \text{(Eq 3)}$$

Refining the estimate of Eq 1, the following inequality is used:

$$\min_{Ins \in \mathcal{J}} \max_{G_i \in \mathcal{P}(Ins)} \max_{\mathcal{E} \in G_i} EH(\mathcal{E}) \leq \# \text{ nodes} \quad \text{(Ed 4)}$$

Moreover, the left side of the above inequality defines precise minimal number of nodes required for the installation. The above process of creating groups of non-conflicting requirements (based on the number of disjoint requirements for each component) with subsequent separation of those groups into partitions (referred to as "allowed separation") of installation sets allows the calculation of minimal number of nodes that are required for the installation of this Application.

Figure 14:
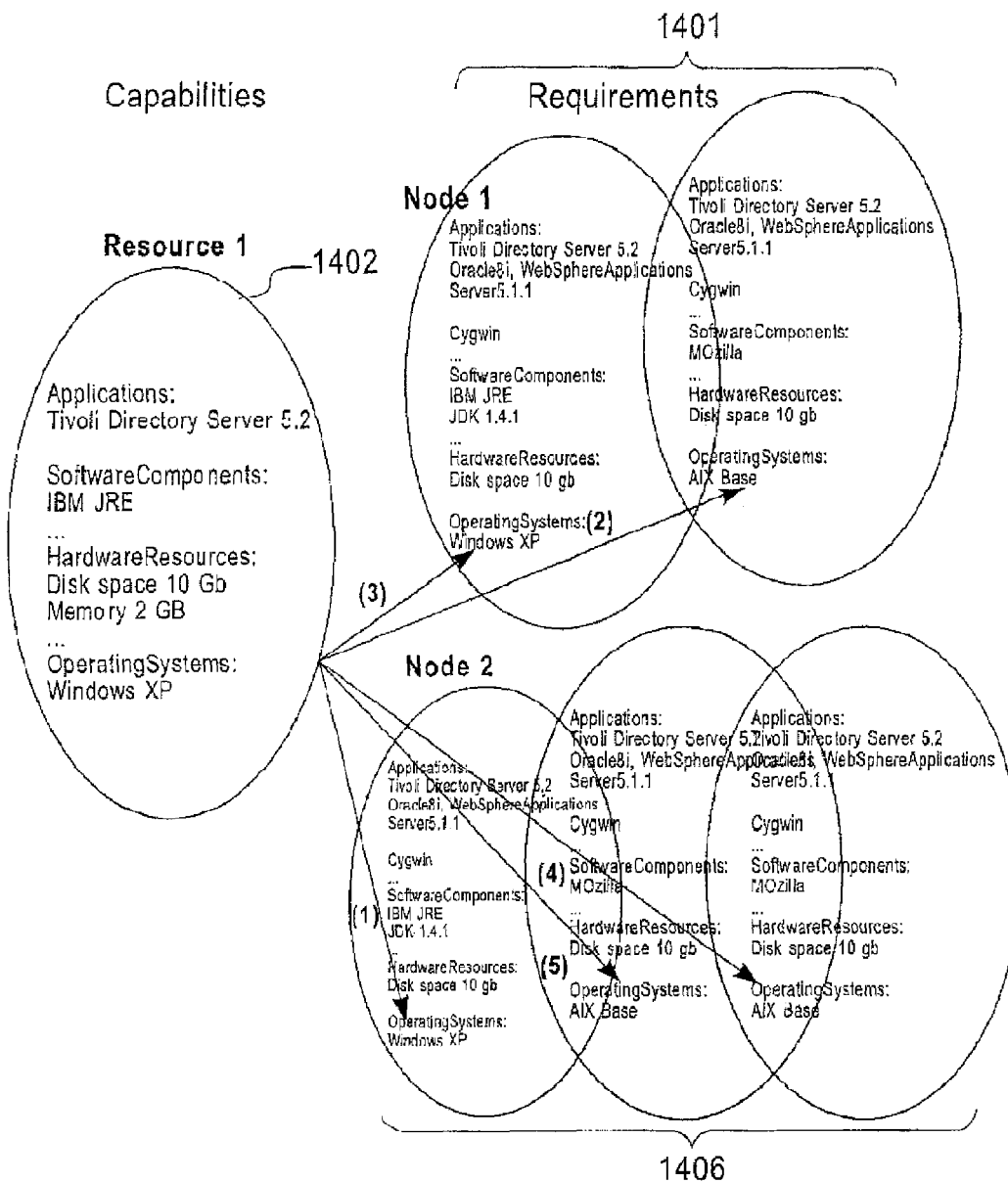
FIG. 14 is an organized representation of a set of capabilities available on a candidate information processing system and multi-node installation topologies created from the refinement process of the decision tables in FIGS. 4-13 according to an embodiment of the present invention.

Once the minimal number of required nodes is determined, a pool of nodes is analyzed to determine nodes that match the software system requiring resources. In one embodiment, a matching algorithm compares requirements for an application to the capabilities of a system starting from the highest level. For example, FIG. 14 shows a set of capabilities (resources) 1402 of a system being analyzed. FIG. 14 also shows two groups of candidate installation topologies 1404, 1406 that are compared with the set of capabilities 1402. The set of capabilities 1402 includes applications, software components, hardware resources, operating systems, and the like that currently exist on the respective system. The groups of installation topologies 1404, 1406 each correspond to a node.

For example, the first installation topology 1404 is associated with a first node and the second installation topology is associated with a second node.

Each installation topology group includes a list of applications, software components, hardware resources, operating systems, and the like that are required for that particular installation of the exemplary software product 112 Tivoli Intelligent Orchestrator. Also, each installation topology group associated with a node includes a number of optional sets of requirements. Each of these optional sets of requirements is compared to the capabilities of the system 1402. In other words, each set is compared (connected by arrow with weight) to capabilities of each resource in the pool. FIG. 14 is an example of the comparison for a first resource. For simplicity, the result of this comparison is represented as a weight value that equals a number of matching requirement-capability pairs. For example, if both capabilities for the resource and Node 1 requirements coincide on system and database only, then the weight for that arrow is equal to 2. It should be noted that the result of a comparison is not limited to being represented in such a way.

In one embodiment, if conflicting requirement-capability pairs are found, the set of requirements excluded from consideration. The comparison procedure is repeated for each computer system in the pool. Matches between existing capabilities on the respective system and each set of installation topologies is accomplished, in one embodiment, by looping through the sets of requirements, applications first followed by software components, hardware components, operating systems, and the like. Once a requirement is matched to a capability, all subsequently derived requirements for the matched entry are eliminated from further processing. For example, if the matched requirement A requires B and requirement B requires C, then the derived requirements B and C are eliminated from further processing because they are assumed to be present due to the installation of component A.

This matching process can produce multiple matching pairs, e.g. (Capability, RequirementsGroup), with missing requirements, i.e. (requirements not existing on the system as a capability) clearly identified. Combining the missing requirements into a re-ordered list (which lists components first then applications) defines installation procedures required to be performed to install the software product 112. This process relies on the fact that capabilities include all installed applications and software components, thus ensuring that a match found on the application level is also found for the components which are required for this application, and therefore both application and components (dependencies) that are already installed are excluded from install procedures.

Node resource description tables are then created from the results of the above comparisons that define an optimal resource allocation as a distribution of requirements to the minimum number of resources with maximum matching of the pre-existing capabilities. FIG. 15 is one example of a node resource description table. Note, that while there are three optional sets for Node 2, Resource 2 has only two values specified for the Node 2. This is an example of the case when one of the optional sets of requirements for Node 2 and Resource 2 capability identified as conflicting pair, and therefore this optional set excluded out of further processing. FIG. 16 is an example of a node resource description table for a k-node topology for a pool or n computer systems.

As stated above, an optimal resource allocation can be defined as distribution of requirements to minimum number of resources with maximum matching of the pre-existing capabilities. In general the problem can be formulated as an integer programming ("IP") problem. IP formulation of the problem is to maximize the equation:

$$\sum_0^i w_{ij} \cdot x_{ij}$$

under the condition that $$\sum_0^i x_{ij} \le 1 \text{ and } \sum_0^j x_{ij} \le 1$$

where weights $w_{ij}$ are values of preexisting components for Resource-Node pair.

Such problems are in general proven to be NP complete. However, in one embodiment, optimal resource allocation can be formulated as a weighted matching problem, which maybe solved in polynomial of degree 4 steps. Weighted matching problems are discussed in greater detail in E. Lawler, Combinatorial Optimization: Network and Matroids, Dover 2001, which is hereby incorporated by reference in its entirety. Therefore, optimal resource allocation over minimal number of resources can be determined by solving the weighted matching problem.

Exemplary Process of the Present Invention

Figure 17:
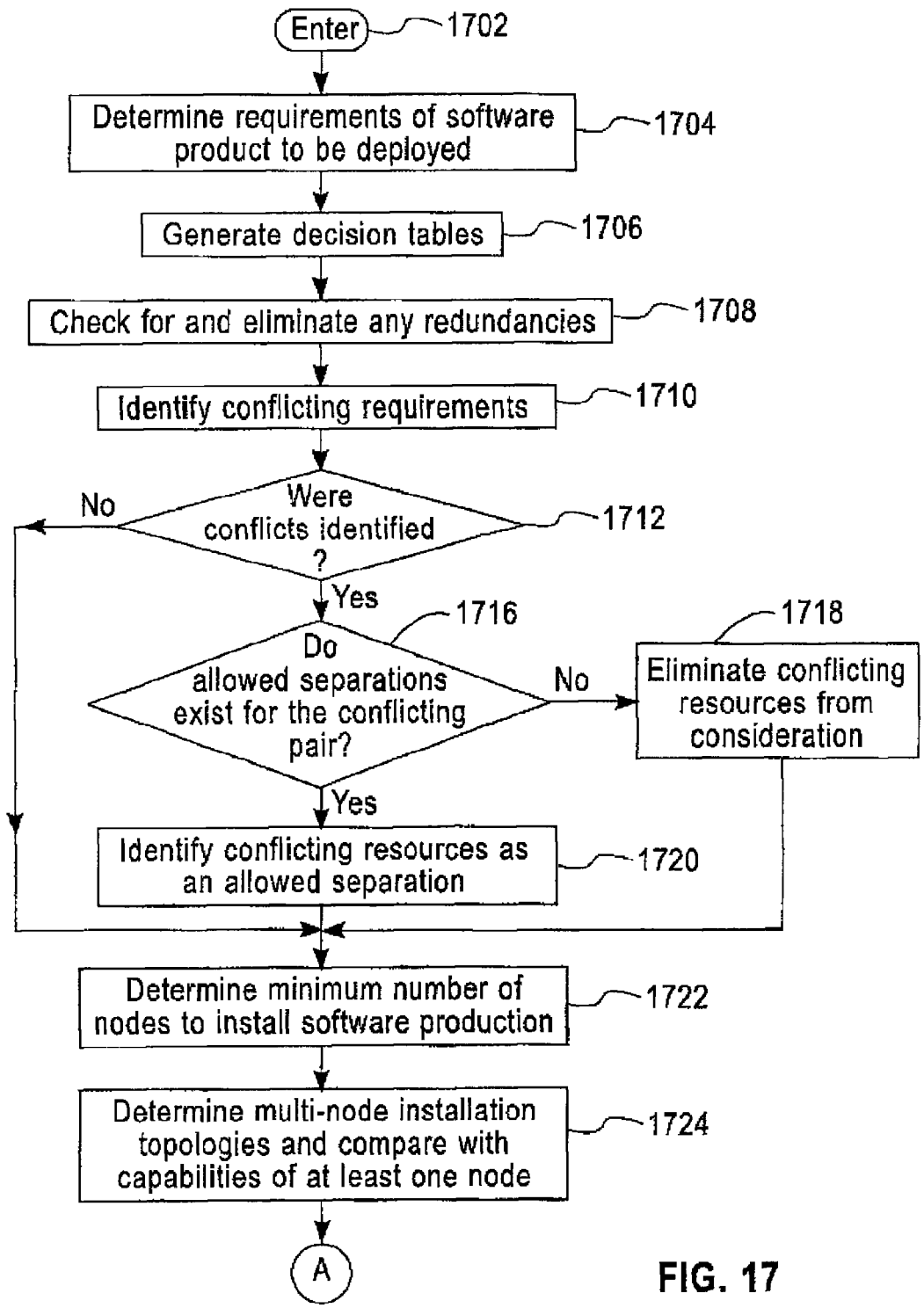
FIG. 17 is an operational flow diagram illustrating an overall process for determining a optimal nodes for installation of a software product according to an embodiment of the present invention.

FIG. 17 is an operational flow diagram illustrating an exemplary process of determining a optimal nodes for installation of a software product 112. The operational flow diagram of FIG. 17 begins at step 1702 and flows directly to step 1704. The requirement analyzer 224, at step 1704, determines the requirements of the software product 112 to be deployed. The requirements in the exemplary embodiment are provided, for example, by manual entry. Decision tables, at step 1706, are generated for determining minimal sets of requirements. For example, the redundancy checker 228, at step 1708, checks for and eliminates any redundancies in the sets as described above with respect to the above section entitled "Eliminating Conflicting And Redundant Requirements". The conflict checker 230, at step 1710, identifies any conflicts in the set.

The conflict checker 230, at step 1712, determines if any conflicts were identified. If the result of this determination is negative, the process advances to step 1722. If the result of this determination is positive, the conflicting resources, at step 1716, are analyzed to determine whether they are an allowed separation pair. In other words, the conflicting resources are analyzed to determine whether they can each be installed on separate nodes. If the result of this determination is negative, the conflicting requirements, at step 1718, are eliminated from consideration and the control flows to step 1722. If the result of the determination is positive, the conflicting requirements, at step 1720, are identified as an allowed separation pair. This process is repeated for each conflicting requirement pair.

Figure 18:
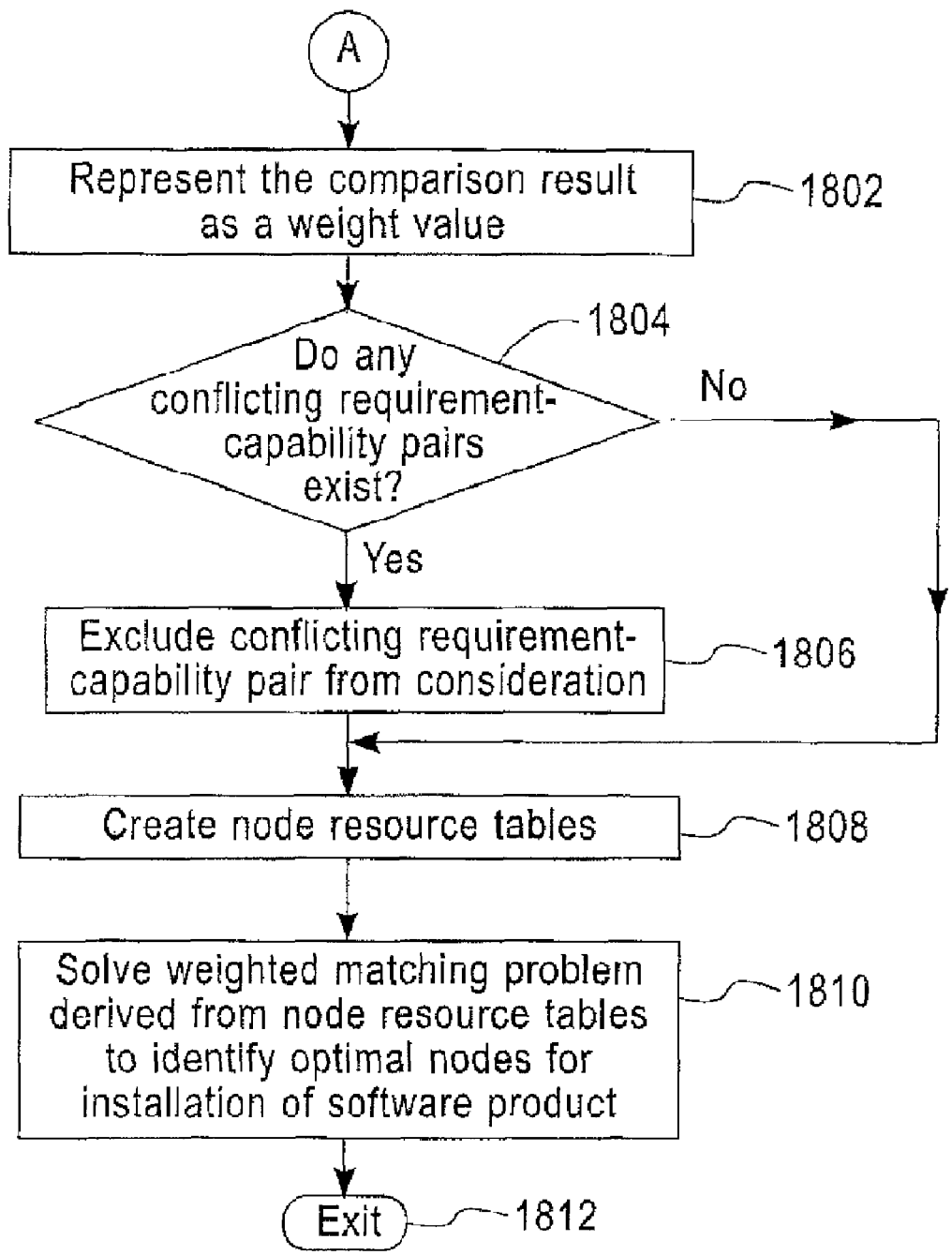
FIG. 18 is an operational flow diagram continuing the process flow of the operational flow diagram in FIG. 17.

The deployment manager 124, at step 1722, determines the minimum number of nodes required to install the software product 112 based at least in part on the identified allowed separations. Installation topologies, at step 1724, determined based at least in part on the allowed separations are compared with the capabilities of each available information processing node, as described above with respect to the section entitled "Matching System Capabilities To Installation Topologies". As discussed above, each installation topology corresponds to a node and can include one or more optional sets of requirements. Each of these optional sets are compared with the capabilities of each available information processing node at step 1724 above. The process continues at entry point A of FIG. 18.

The result of each comparison at step 1724 of FIG. 17 is represented, at step 1802, as a weight value that equals a number of matching requirement-capability pairs. It should be noted that the result of a comparison is not limited to being represented in such a way. A determination, at step 1804, is made whether conflicting requirement-capability pairs are found. If the result of this determination is negative, the control flows to step 1808. If the result of this determination is positive, the set of conflicting requirement-capability pairs, at step 1806, is excluded from consideration. Based on the comparison results, node resource description tables, at step 1808, are created. The node resource description tables define an optimal resource allocation as a distribution of requirements to the minimum number of resources with maximum matching of the pre-existing capabilities. An optimal installation topology, at step 1810, is selected from the node resource description tables by solving a weighted matching problem. The control flow then exits at step 1812.

Non-Limiting Examples

The foregoing embodiments of the present invention are advantageous because they allow for complex deployment decisions on provisioning complex software within large distributed environment compatible inputs and outputs to be automated are at least aided. Another advantage is that software requirements are matched to system capabilities for provisioning tasks within a pool of targets in such a way that a specified cost objective is met. The present invention allows for a configuration topology for the application to be determined based on the capacity of the systems that are available for the particular software product.

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for provisioning software on a plurality of computational nodes in a distributed computing environment, the method on an information processing system comprising:
accepting a plurality of support processing requirements associated with a software product each of the support processing requirements specifying a support component required by the software product;
expanding the plurality of requirements into multiple sets of installation requirements;
minimizing at least one set of installation requirements in the multiple sets of installation requirements to produce at least one minimized set of installation requirements;

determining whether any pair of requirements in the minimized set of installation requirements includes a pair of conflicting requirements;

determining, in response to at least one pair of requirements in the minimized set of installation requirements conflicting, whether the software product allows each requirement in the at least one pair of conflicting requirements to be located on separate nodes; and determining at least one multi-node installation topology for the software product in response to determining that the software product allows each requirement in the at least one pair of conflicting requirements to be installed on separate nodes, wherein the at least one multi-node installation topology includes a plurality of installation requirement sets for each node in the multi-node installation topology.

2. The method of claim 1, further comprising:

comparing each installation requirement set in the plurality of installation requirement sets included in the at least one multi-node installation topology to a set of capabilities included on at least one computational node; and identifying, in response to the comparing, matching requirement-capability pairs associated with the installation requirement set for each of the at least one computational node.

3. The method of claim 2, further comprising:

assigning a weight value to each installation requirement set for each of the at least one computational node based on a number of matching requirement-capability pairs identified in response to the comparing.

4. The method of claim 2, further comprising:

creating, in response to the comparing, at least one node resource table representing the comparison of each installation requirement set to the set of capabilities included on each of the at least one computational node and the identified matching requirement-capability pairs associated with each installation requirement set for each of the at least one computational node.

5. The method of claim 2, further comprising:

determining for each node, in response to the identifying, an installation requirement set in the plurality of installation requirement sets comprising the highest number of matching requirement-capability pairs.

6. The method of claim 5, further comprising:

creating a weighted matching problem based at least in part on the determined installation requirement set for each node comprising the highest number of matching requirement-capability pairs; and selecting a multi-node installation topology for installing the software product based on the weighted matching problem.

7. The method of claim 1, wherein at least one of the expanding the plurality of requirements, the minimizing at least one set of installation requirements, and the determining at least one installation topology is based on Rough Set Theory.

8. The method of claim 1, wherein the plurality of requirements includes at least one of one or more software requirements, and one or more hardware requirements.

9. The method of claim 1, wherein the accepting comprises arranging the requirements into a hierarchy based upon resource dependencies.

10. The method of claim 8, further comprising:

creating at least one first decision table associated with the software product, the at least one first decision table including a set of requirements in a top-most level of the hierarchy; and creating at least one second decision table associated with a respective requirement in at least one lower level of the hierarchy, the at least one second decision table including a first entry identifying the respective requirement associated with the at least one second decision table and at least one second entry identifying at least one dependent requirement of the respective requirement and a respective ordinal representation associate with each dependent requirement of the respective requirement being the ordinal representation indicative of the dependent requirement and higher level requirements in the hierarchy.

11. An information processing system for provisioning software on a plurality of computational nodes in a distributed computing environment, information processing system comprising:

a memory;

a processor communicatively coupled to the memory; and a deployment manager communicatively coupled to the memory and the processor, the deployment manager adapted to:

accepting a plurality of support processing requirements associated with a software product each of the support processing requirements specifying a support component required by the software product;

expanding the plurality of requirements into multiple sets of installation requirements;

minimizing at least one set of installation requirements in the multiple sets of installation requirements to produce at least one minimized set of installation requirements;

determining whether any pair of requirements in the minimized set of installation requirements includes a pair of conflicting requirements;

determining, in response to at least one pair of requirements in the minimized set of installation requirements conflicting, whether the software product allows each requirement in the at least one pair of conflicting requirements to be located on separate nodes; and determining at least one multi-node installation topology for the software product in response to determining that the software product allows each requirement in the at least one pair of conflicting requirements to be installed on separate nodes, wherein the at least one multi-node installation topology includes a plurality of installation requirement sets for each node in the multi-node installation topology.

12. The information processing system of claim 11, wherein the deployment manager is further adapted to:

comparing each installation requirement set in the plurality of installation requirement sets included in the at least one multi-node installation topology to a set of capabilities included on at least one computational node; and identifying, in response to the comparing, matching requirement-capability pairs associated with the installation requirement set for each of the at least one computational node.

13. The information processing system of claim 12, wherein the deployment manager is further adapted to:

assigning a weight value to each installation requirement set for each of the at least one computational node based on a number of matching requirement-capability pairs identified in response to the comparing;

creating, in response to the comparing, at least one node resource table representing the comparison of each installation requirement set to the set of capabilities included on each of the at least one computational node and the identified matching requirement-capability pairs associated with each installation requirement set for each of the at least one computational node; and determining for each node, in response to the identifying, an installation requirement set in the plurality of installation requirement sets comprising the highest number of matching requirement-capability pairs.

14. The information processing system of claim 13, wherein the deployment manager is further adapted to:

creating a weighted matching problem based at least in part on the determined installation requirement set for each node comprising the highest number of matching requirement-capability pairs; and selecting a multi-node installation topology for installing the software product based on the weighted matching problem.

15. A computer program product for provisioning software on a plurality of computational nodes in a distributed computing environment, the computer program product comprising instructions for:

accepting a plurality of support processing requirements associated with a software product each of the support processing requirements specifying a support component required by the software product;

expanding the plurality of requirements into multiple sets of installation requirements;

minimizing at least one set of installation requirements in the multiple sets of installation requirements to produce at least one minimized set of installation requirements;

determining whether any pair of requirements in the minimized set of installation requirements includes a pair of conflicting requirements;

determining, in response to at least one pair of requirements in the minimized set of installation requirements conflicting, whether the software product allows each requirement in the at least one pair of conflicting requirements to be located on separate nodes; and determining at least one multi-node installation topology for the software product in response to determining that the software product allows each requirement in the at least one pair of conflicting requirements to be installed on separate nodes, wherein the at least one multi-node installation topology includes a plurality of installation requirement sets for each node in the multi-node installation topology.

16. The computer program product of claim 15, further comprising instructions for:

comparing each installation requirement set in the plurality of installation requirement sets included in the at least one multi-node installation topology to a set of capabilities included on at least one computational node; and identifying, in response to the comparing, matching requirement-capability pairs associated with the installation requirement set for each of the at least one computational node.

17. The computer program product of claim 16, further comprising instructions for:

assigning a weight value to each installation requirement set for each of the at least one computational node based on a number of matching requirement-capability pairs identified in response to the comparing.

18. The computer program product of claim 16, further comprising instructions for:

creating, in response to the comparing, at least one node resource table representing the comparison of each installation requirement set to the set of capabilities included on each of the at least one computational node and the identified matching requirement-capability pairs associated with each installation requirement set for each of the at least one computational node.

19. The computer program product of claim 16, further comprising instructions for:

determining for each node, in response to the identifying, an installation requirement set in the plurality of installation requirement sets comprising the highest number of matching requirement-capability pairs.

20. The computer program product of claim 19, further comprising instructions for: creating a weighted matching problem based at least in part on the determined installation requirement set for each node comprising the highest number of matching requirement-capability pairs; and selecting a multi-node installation topology for installing the software product based on the weighted matching problem.

* * * * *